(12) United States Patent
Suleiman

(10) Patent No.: US 10,335,875 B2
(45) Date of Patent: Jul. 2, 2019

(54) METHODS AND DEVICES FOR DICING COMPONENTS FROM A SHEET OF COPPER ALLOY

(71) Applicant: Texas Instruments Incorporated, Dallas, TX (US)

(72) Inventor: Wan Mohd Misuari Suleiman, Kuala Lumpur (MY)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/165,578

(22) Filed: May 26, 2016

(65) Prior Publication Data

US 2017/0341170 A1   Nov. 30, 2017

(51) Int. Cl.
| | | |
|---|---|---|
| *B23D 61/02* | (2006.01) | |
| *B24B 27/06* | (2006.01) | |
| *H01C 17/245* | (2006.01) | |
| *B23D 45/00* | (2006.01) | |
| *B23D 45/02* | (2006.01) | |
| *H01C 7/00* | (2006.01) | |

(52) U.S. Cl.
CPC ......... *B23D 61/025* (2013.01); *B23D 45/003* (2013.01); *B23D 45/021* (2013.01); *B24B 27/06* (2013.01); *H01C 17/245* (2013.01); *H01C 7/003* (2013.01); *H01C 7/006* (2013.01)

(58) Field of Classification Search
CPC .. B23D 61/025; B23D 45/003; B23D 45/021; B24B 27/06; H01C 17/245
See application file for complete search history.

(56) References Cited

U.S. PATENT DOCUMENTS

| | | | |
|---|---|---|---|
| 7,847,391 B2 | 12/2010 | Udompanyavit et al. | |
| 8,053,898 B2 | 11/2011 | Marcoux | |
| 8,129,228 B2 | 3/2012 | Udompanyavit et al. | |
| 8,324,721 B2 | 12/2012 | Udompanyavit et al. | |
| 8,697,496 B1 | 4/2014 | Abbott et al. | |
| 8,928,115 B2 | 1/2015 | Hauenstein | |
| 2003/0159555 A1* | 8/2003 | Perry .................. | B23D 61/025 83/13 |
| 2007/0063333 A1 | 3/2007 | Mohd Arshad | |
| 2009/0199693 A1* | 8/2009 | Heyen .................. | B23D 61/021 83/835 |
| 2013/0298744 A1* | 11/2013 | Kumazawa ........ | B23K 26/0093 83/863 |
| 2014/0298968 A1* | 10/2014 | Hirosawa ................ | H01L 21/78 83/39 |
| 2014/0306330 A1 | 10/2014 | Williams | |

(Continued)

OTHER PUBLICATIONS

Yue, Fatt Seng; Suleiman, Wan Mohd Misuari; U.S. Appl. No. 15/141,639, filed Apr. 28, 2016 for "Shunt Strip," 26 pages.

(Continued)

*Primary Examiner* — Omar Flores Sanchez
(74) *Attorney, Agent, or Firm* — Ronald O. Neerings; Charles A. Brill; Frank D. Cimino

(57) ABSTRACT

A saw blade for dicing a sheet of copper alloy to form individual resistors is disclosed, wherein the sheet of copper alloy has a thickness of less than 0.3 mm. The saw blade includes a ring having a first side, a second side, and a circumferential surface, wherein the thickness of the ring between the first side and the second side is less than 0.6 mm.

39 Claims, 5 Drawing Sheets

(56) References Cited

U.S. PATENT DOCUMENTS

| | | |
|---|---|---|
| 2015/0020670 A1* | 1/2015 | Wakita .................... B27B 5/325 83/522.12 |
| 2015/0311144 A1 | 10/2015 | Williams et al. |
| 2015/0380384 A1 | 12/2015 | Williams et al. |
| 2016/0005732 A1 | 1/2016 | Wood |

OTHER PUBLICATIONS

Suleiman, Wan Mohd Misuari; Krishnan, Nageswararau; U.S. Appl. No. 15/145,083 Fled May 3, 2016 for "Component Sheet and Method of Singulating," 21 pages.

\* cited by examiner

US 10,335,875 B2

METHODS AND DEVICES FOR DICING COMPONENTS FROM A SHEET OF COPPER ALLOY

BACKGROUND

Shunts are small pieces of conductive material. In some applications, they are used as shunt resistors that pass high current while having a small voltage drop across the shunt resistor. The voltage drop across a shunt resistor is proportional to the current flow through the shunt resistor. Accordingly, the current flow through a device or circuit is readily derived by measuring the voltage drop across a shunt resistor.

Shunt resistors used in integrated circuits are typically fabricated on a sheet of conductive material, such as copper alloy, which is malleable. Etching or other processes are applied to the sheet to generate individual shunt resistors that are connected to one another by tabs or the like that hold the individual shunt resistors to the sheet during fabrication. An adhesive film is adhered to the bottom surface of the sheet to provide support to the etched sheet. An abrasive blade cuts or singulates the individual shunt resistors. Abrasive blades are typically coated with a fine grit that gets covered with ductile material from the adhesive film and the malleable material from which the sheet is made. These materials covering the blade result in the adhesive film tearing and blades breaking during singulation. Furthermore, the materials covering the blades result in poor singulation quality.

SUMMARY

A saw blade for dicing a sheet of copper alloy to form individual resistors is disclosed, wherein the sheet of copper alloy has a thickness of less than 0.3 mm. The saw blade includes a ring having a first side, a second side, and a circumferential surface, wherein the thickness of the ring between the first side and the second side is less than 0.6 mm.

DETAILED DESCRIPTION

Shunt resistors are pieces of conductive material used in electronic devices and circuits. In some applications, shunt resistors pass high current while having a small voltage drop across the shunt resistor. The voltage drop across a shunt resistor is proportional to the current flow through the shunt resistor. Devices measure this voltage drop to calculate the current flow through the shunt resistor.

Shunt resistors used in integrated circuits are typically fabricated on a sheet of conductive material, such as copper alloy, which is malleable. A plurality of resistors are formed on and singulated from a single sheet of material. Etching or other processes are applied to the sheet to generate individual resistors that are connected to one another by tabs or the like. An adhesive film is adhered to the bottom surface of the sheet to provide support to the etched sheet. An abrasive blade cuts or singulates the individual resistors from one another. Abrasive blades are typically coated with a fine grit that gets covered with or clogged with ductile material from the adhesive film and the malleable material from which the sheet is made during the singulation operation. These materials covering the blade result in the adhesive film tearing and blades breaking during the singulation process. Furthermore, the materials covering the blades result in poor quality of singulating.

Figure 1:
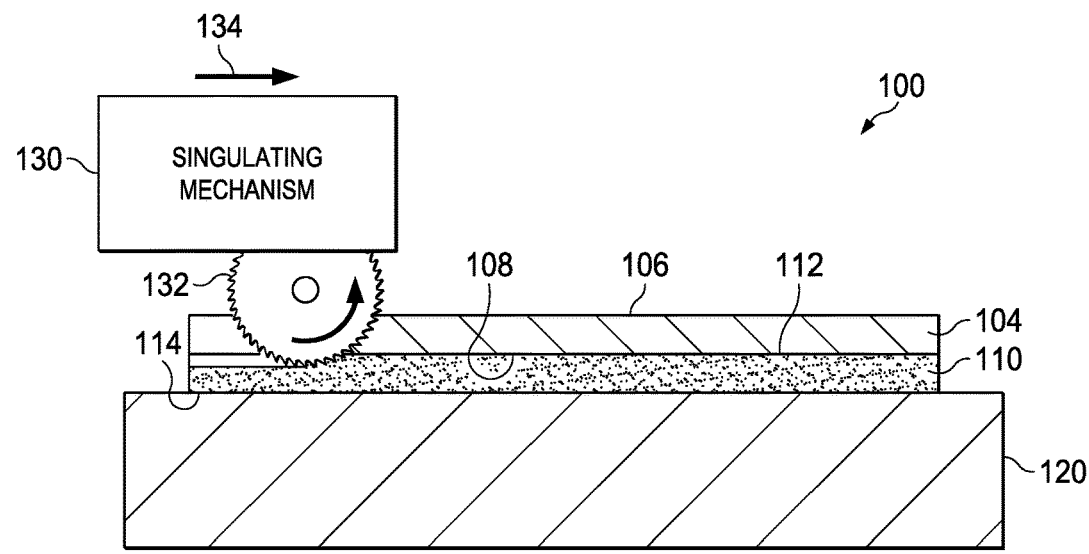
FIG. 1 is a side, cutaway view of a singulating device dicing a sheet to form individual resistors.

FIG. 1 is a side, cutaway view of a singulating system 100 singulating a sheet 104 of resistors. The sheet 104 has a top surface 106 and an opposite facing bottom surface 108. An adhesive film, referred to herein as the dicing tape 110 is adhered to the bottom surface 108 of the sheet 104. The dicing tape 110 has a top surface 112 adhered to the bottom surface 108 of the sheet 104 and an opposite facing bottom surface 114. The sheet 104, including the dicing tape 110, sets on a chuck table 120, wherein the bottom surface 114 of the dicing tape 110 is adjacent the chuck table 120. The chuck table 120 maintains the sheet 104 in a fixed position during singulation.

A singulating mechanism 130 singulates individual resistors from the sheet 104. The singulating mechanism 130 rotates a saw blade 132 in a counter-clockwise direction as shown in FIG. 1 while moving in a direction 134. Various saw blades are described herein that provide better longevity and cutting ability than conventional saw blades. The saw blade shown in FIG. 1 is a toothed saw blade that provides many benefits over conventional saw blades.

Figure 2:
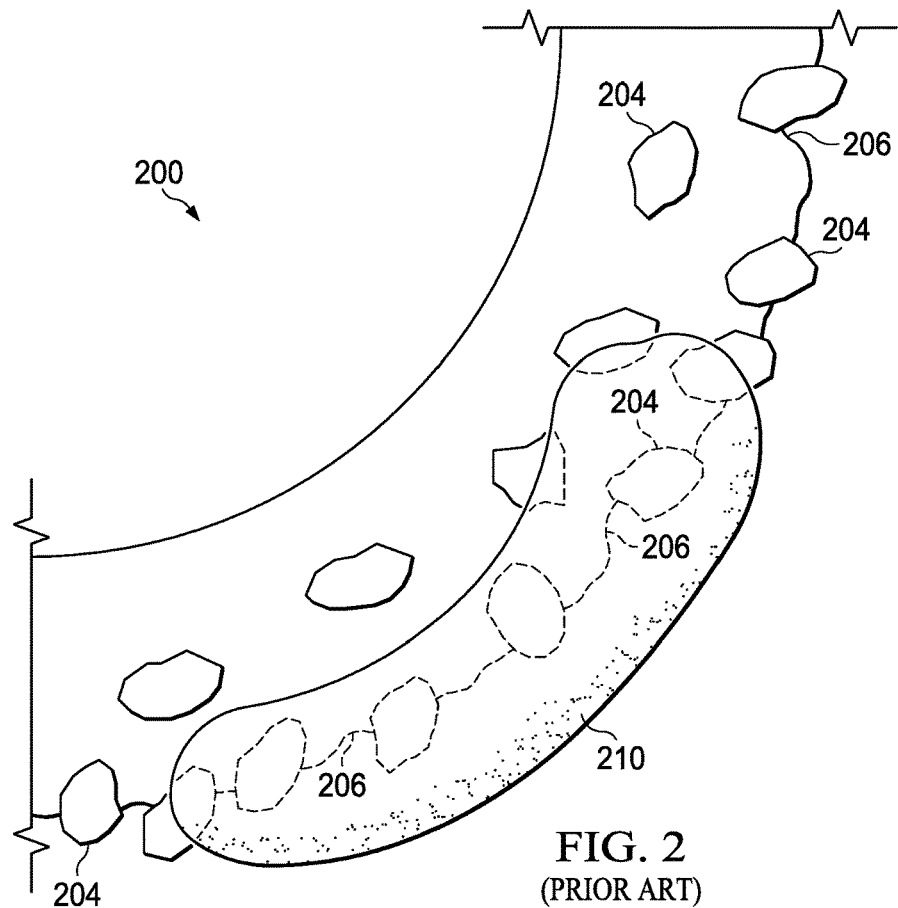
FIG. 2 is a side, partial view of an example of an abrasive saw blade that is clogged with material from the sheet of resistors.

FIG. 2 is a side, partial view of an example of an abrasive saw blade 200 that is clogged with material from a sheet, such as the sheet 104 of FIG. 1. The saw blade 200 includes a plurality of grit pieces 204 and chip pockets 206. In some examples, the grit pieces 204 have diameters of less than 12 um. The grit pieces 204 are hard abrasive pieces that cut material as the saw blade 200 rotates. The chip pockets 206 are voids or the like in the saw blade 200 in which debris collects. In the example of FIG. 1, a volume of debris 210 from a sheet has collected on the saw blade 200. The debris includes the metal from the sheet and pieces of dicing tape. The problem of debris 210 clogging the saw blade 200 is referred to as "blade loading" and causes friction between the saw blade 200 and the sheet instead of cutting the sheet. In some examples, the saw blade 200 rotates at 30,000 RPM, which combined with the friction, causes the saw blade 200 to become more clogged and perform poor cuts on both the sheet and the dicing tape.

Figure 3:
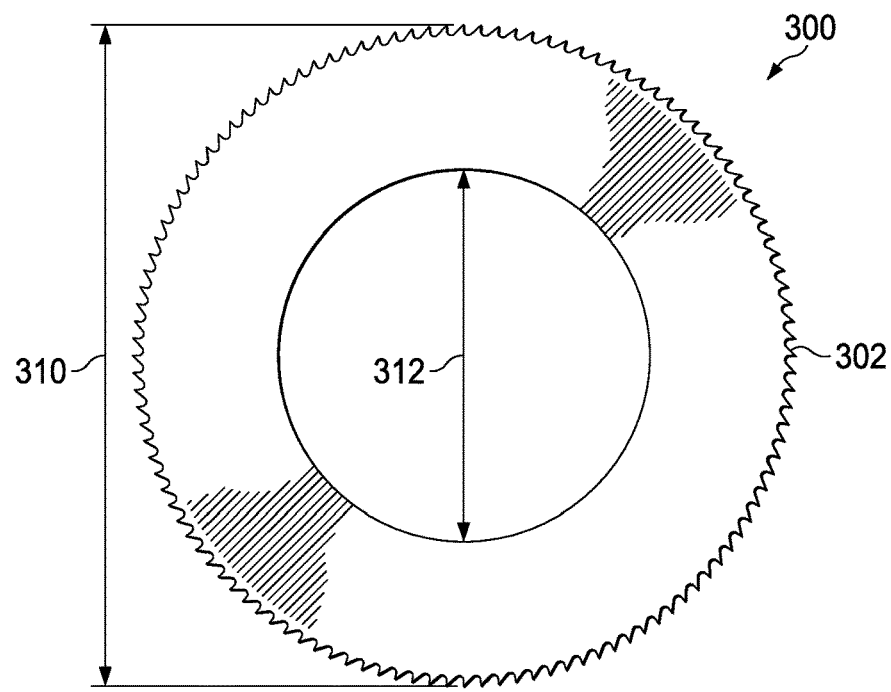
FIG. 3 is a side elevation view of a toothed saw blade for singulating the sheet of FIG. 1 to form individual resistors.

The above-described blade loading is prevented by having less friction between the sheet and the blade and better cooling of the blade during singulation. The applicants have experimented and researched to find blades described herein that overcome the above-described problems when cutting copper alloy. These blades were not known in the past to function as cutting blades for copper alloy sheets as described herein. FIG. 3 is a side view of a portion of a saw blade 300 having teeth instead of the fine grit of conventional saw blades. Saw blades having teeth have not been used in singulation of shunt resistor sheets due to several problems. For example, the saw blade has to be extremely thin and have the strength to cut through the sheet, which is usually copper alloy. The copper alloy is very malleable, which makes it susceptible to burring during cutting. For these reasons, there has not been a saw blade having teeth to cut sheets of shunt resistors.

The applicants have found a saw blade 300 that has teeth 302 rather than grit pieces as shown in FIG. 2 and is capable of dicing the sheet 104 with no or few small burrs. The saw blade 300 is made of a hard material such as Japanese Industrial Standard (JIS) JIS K10 or similar material. The example saw blade 300 has a hardness of approximately 92.0 HRA, a transverse rupture strength of 3.2 Gpa, a fracture toughness of approximately 6.8 Mpa ($m^{1/2}$), and a density of approximately 14.9 $g/cm^3$. The saw blade 300 is ring-shaped with an outer diameter 310 and an inner diameter 312. In some examples, the outer diameter 310 is between 4.9 cm and 7.4 cm. The thickness of the saw blade 300 is between 0.08 mm and 0.3 mm. It is noted that the saw blade 300, including the teeth 302 may have the same thickness and hardness. In some examples, the teeth 302 extend approximately 1.0 mm from a circumferential surface of the saw blade 300. The thin saw blade 300 is very hard, so it is able to withstand the forces exerted on it when it is used as the blade 132 in the singulating system 100 of FIG. 1.

The saw blade 300 rotates at about 9,000 RPM, which is fast enough to cut the sheet 104 and the dicing tape 110 without creating substantial burrs. In some examples, the singulating device 130 moves in the direction 134 at speeds up to 150 mm per second with the same amount of burring that occurs with abrasive blades moving at speeds of 75 mm per second. At these speeds, the saw blade 300 does not incur damage and the dicing tape 120 does not tear other than where it was cut by the saw blade 300.

Another example of a saw blade is an abrasive saw blade, but with larger grit elements than those conventionally used in semiconductor dicing. The grit size is referred to as less than #320 or having an average size greater than 31 um. The larger grit functions in the same or a similar manner as the teeth 302 in the saw blade 300. More specifically, the larger grit cuts the sheet 104 and the dicing tape 110 instead of grinding the sheet 104 as is done with abrasive saw blades.

Figure 4A:
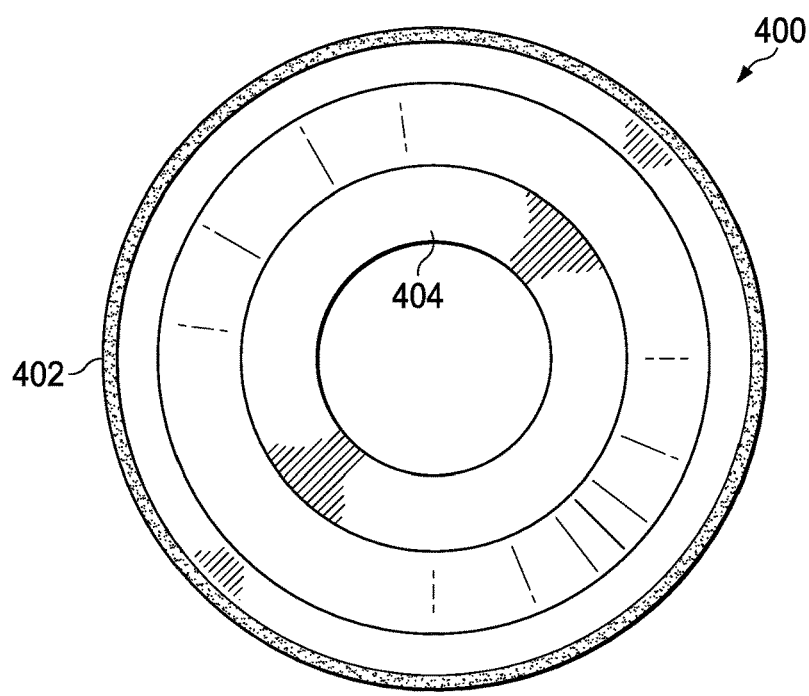
FIG. 4A is a side elevation view of a saw blade having a small ring with a hub located therein.
Figure 4B:
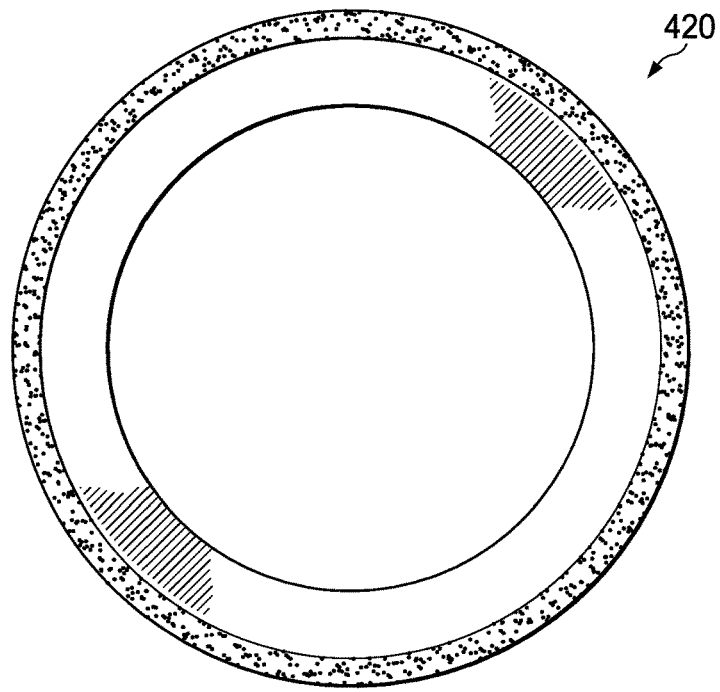
FIG. 4B is a side elevation view of a saw blade in the form of a large ring.
Figure 4C:
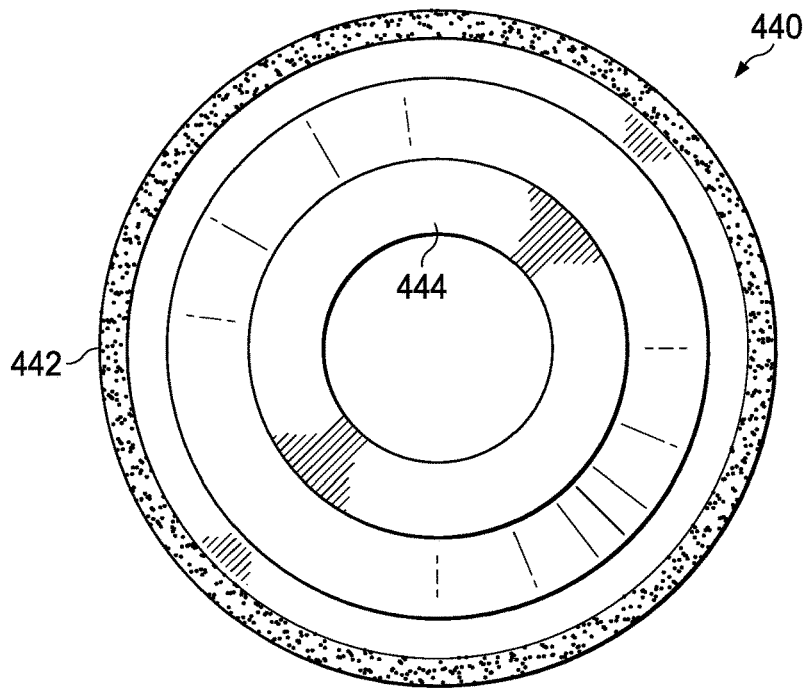
FIG. 4C is a side elevation view of a saw blade having a large ring with a hub located therein.

Other examples of the saw blades have central hubs, where a ring with the cutting material is affixed to the hub. FIG. 4A is a side elevation view of a saw blade 400 having a small ring 402 with a hub 404 located therein. The saw blade 400 is typical of an abrasive saw blade having fine grit or small grit element, such as those described in FIG. 2, located on the ring 402. FIG. 4B is a side elevation view of a saw blade 420 in the form of a large ring. The saw blade 420 is typical of a saw blade having large grit as described above. The saw blade 420 is a single ring of material that holds the grit. As shown in FIG. 4B, the saw blade 420 does not have a hub. FIG. 4C is a side elevation view of a saw blade 440 having a large ring 442 with a hub 444 located therein. The saw blade 440 includes the large grit in the ring 442 with the additional strength of the hub 444. The additional strength of the hub 444 enables the saw blade 440 to dice the sheet 104, FIG. 1, without breaking. The saw blade 440 may have the same dimensions and characteristics as the saw blade 300 of FIG. 3.

Figure 5A:
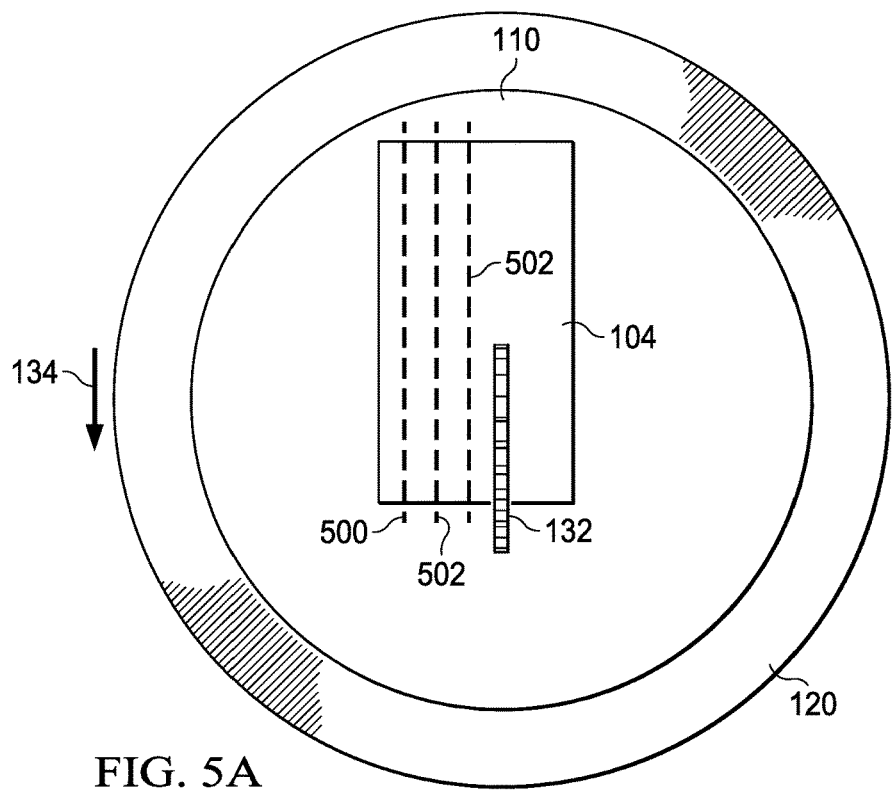
FIG. 5A is a top plan view of the chuck table of FIG. 1 with the sheet being diced in a first direction.

FIG. 5A is a top plan view of the chuck table 120 of FIG. 1 with the sheet 104 being diced in first direction. More specifically, first cuts are being made to the sheet 104. The process of cutting the sheet 104 includes lowering the rotating saw blade 132 to a height where it cuts through the sheet 104 and into the dicing tape 110. The sheet 104 is fed into the rotating blade 132 by movement of the 120 chuck table or the singulating mechanism 130. The cutting starts from a first edge of the sheet 104 and traverse to the opposite second edge to make a first cut 500. The blade 132 is then raised to a height above the sheet 104 and the saw blade 132 is located at the first edge of the sheet 104. The saw blade 132 is then moved relative to the sheet 104 to make a second cut that is parallel to the first cut. The process continues until a predetermined number of parallel cuts 502 as shown by the dashed lines of FIG. 5A are made.

Figure 5B:
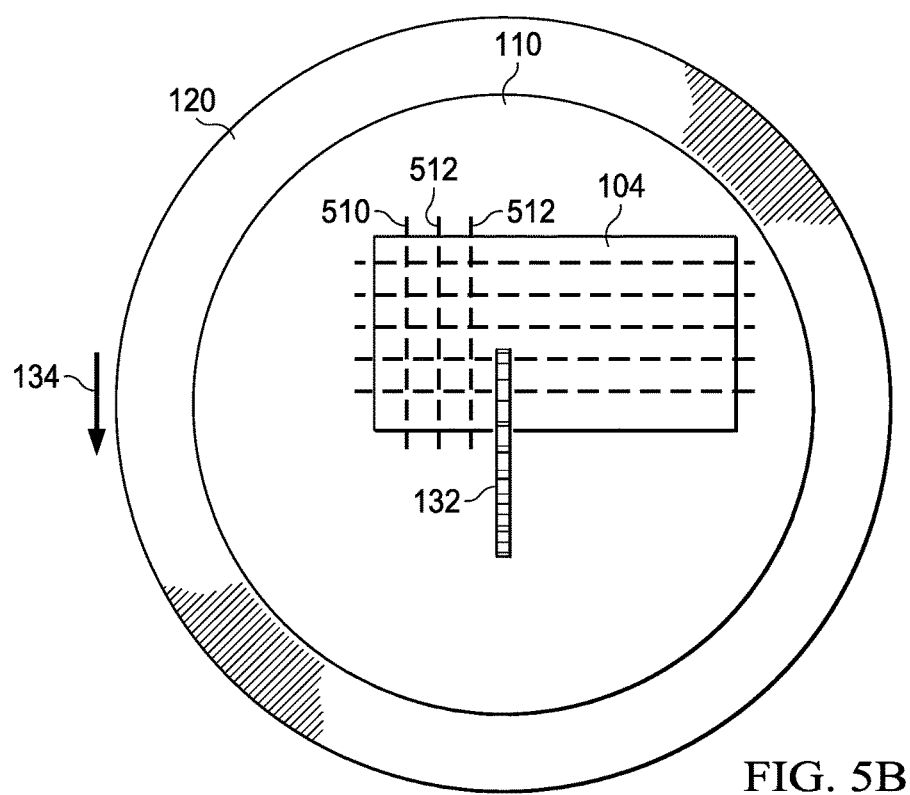
FIG. 5B is a top plan view of the chuck table of FIG. 1 with the sheet being diced in a second direction.

FIG. 5B is a top plan view of the chuck table 120 of FIG. 1 with the sheet 104 being diced in a second direction, wherein the second direction is perpendicular to the first direction. The chuck table 120 is rotated ninety degrees or the singulating mechanism 130, FIG. 1, is rotated ninety degrees. A first cut 510 is made in the sheet 104 my moving the singulating device 130 relative to the sheet 104. The process described with reference to FIG. 5A continues to make a plurality of parallel cuts 512 as shown by the dashed lines of FIG. 5B. The result is a plurality of individual resistors with few or no burrs.

Figure 6:
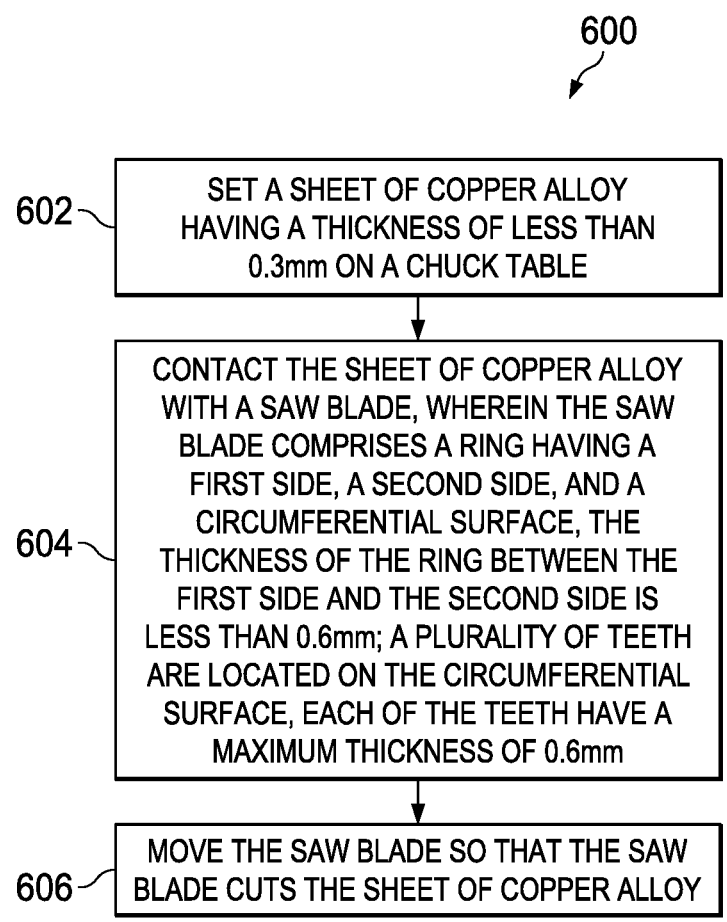
FIG. 6 is a flowchart describing an example of dicing a thin sheet of copper alloy.

FIG. 6 is a flowchart 600 describing an example of dicing a thin sheet of copper alloy to form individual resistors, wherein the sheet of copper alloy has a thickness of less than 0.3 mm. Step 602 includes setting a sheet of copper alloy having a thickness of less than 0.3 mm on a chuck table. Step 604 includes contacting the sheet of copper alloy with a saw blade, wherein the saw blade comprises a ring having a first side, a second side, and a circumferential surface, the thickness of the ring between the first side and the second side is less than 0.6 mm. A plurality of teeth are located on the circumferential surface, each of the teeth have a maximum thickness of 0.6 mm. Step 606 includes moving the saw blade so that the saw blade cuts the sheet of copper alloy.

Although illustrative embodiments have been shown and described by way of example, a wide range of alternative embodiments is possible within the scope of the foregoing disclosure.

What is claimed is:

1. A saw blade for dicing a sheet of copper alloy to form individual resistors, the sheet of copper alloy having a thickness of less than 0.3 mm, the saw blade comprising:
    a ring having a first side, a second side, and a circumferential surface, the thickness of the ring between the first side and the second side is less than 0.6 mm; and
    a plurality of teeth located on the circumferential surface, each of the teeth having a maximum thickness of 0.6 mm.

2. The saw blade of claim 1, wherein the teeth extend approximately 1.0 mm from the circumferential surface of the ring.

3. The saw blade of claim 1, wherein the thickness of the ring between the first side and the second side is less than 0.35 mm and wherein each of the teeth has a thickness of less than 0.35 mm.

4. The saw blade of claim 1, wherein the thickness of the ring between the first side and the second side is approximately 80 um and wherein each of the teeth has a thickness of approximately 80 umm.

5. The saw blade of claim 1, wherein the thickness of the ring between the first side and the second side is approximately 80 um.

6. The saw blade of claim 1, wherein a diameter of the circumferential surface is 7.4 cm or less.

7. The saw blade of claim 1, wherein a diameter of the circumferential surface is between 4.9 cm and 7.4 cm.

8. The saw blade of claim 1, wherein the thickness of the ring between the first side and the second side is between 0.08 mm and 0.3 mm.

9. The saw blade of claim 1, wherein the teeth extend approximately 1.0 mm from the circumferential surface.

10. A saw blade for dicing a sheet of copper alloy to form individual resistors, the sheet of copper alloy having a thickness of less than 0.3 mm, the saw blade comprising:
   a ring having a first side, a second side, and a circumferential surface, the thickness of the ring between the first side and the second side is less than 0.6 mm; and
   grit pieces located on the circumferential surface, the average size of the grit pieces being 31 um or greater.

11. The saw blade of claim 10, wherein the sheet of copper alloy has a thickness of about 0.2 mm.

12. The saw blade of claim 10, wherein each of the average grit size is approximately 29.5 um.

13. The saw blade of claim 10, wherein the thickness of the ring between the first side and the second side is less than 0.35 mm.

14. The saw blade of claim 10, wherein the sheet of copper alloy has dicing tape attached thereto, and wherein the saw blade is for cutting at least partially into the dicing tape.

15. The saw blade of claim 14, wherein the dicing tape has a thickness of approximately 0.13 mm.

16. A method for dicing a sheet of copper alloy to form individual resistors, the method comprising:
   setting a sheet of copper alloy having a thickness of less than 0.3 mm on a chuck table;
   contacting the sheet of copper alloy with a saw blade, the saw blade comprising:
      a ring having a first side, a second side, and a circumferential surface, the thickness of the ring between the first side and the second side is less than 0.6 mm; and
      a plurality of teeth located on the circumferential surface, each of the teeth having a maximum thickness of 0.6 mm; and
   moving the saw blade so that the saw blade cuts the sheet of copper alloy.

17. The method of claim 16, wherein the sheet of copper alloy has a thickness of about 0.2 mm.

18. The method of claim 16, wherein the thickness of the ring between the first side and the second side is less than 0.35 mm and wherein each of the teeth has a thickness of less than 0.35 mm.

19. The method of claim 16, wherein:
   setting a sheet of copper alloy on a chuck table includes providing a sheet of copper alloy with a dicing tape attached thereto;
   contacting the sheet of copper alloy with a saw blade includes contacting the sheet of copper alloy and the dicing tape with the saw blade; and
   moving the saw blade includes moving the saw blade so that the saw blade cuts the sheet of copper alloy and the dicing tape.

20. The method of claim 19, wherein providing a sheet of copper alloy with a dicing tape attached thereto includes providing a sheet of copper alloy with a dicing tape attached thereto wherein the dicing tape has a thickness of approximately 0.13 mm.

21. The method of claim 16, wherein the moving includes moving the saw blade so that the saw blade contacts the sheet in an upward direction relative to rotation of the saw blade.

22. The method of claim 16, wherein a diameter of the circumferential surface is 7.4 cm or less.

23. The method of claim 16, wherein a diameter of the circumferential surface is between 4.9 cm and 7.4 cm.

24. The method of claim 16, wherein the thickness of the ring between the first side and the second side is between 0.08 mm and 0.3 mm.

25. The method of claim 16, wherein the teeth extend approximately 1.0 mm from the circumferential surface.

26. A method for dicing a sheet of copper alloy to form individual components, the method comprising:
   setting a sheet of copper alloy on a chuck table;
   contacting the sheet of copper alloy with a saw blade, the saw blade comprising:
      a ring having a first side, a second side, and a circumferential surface, the thickness of the ring between the first side and the second side is less than 0.6 mm; and
      a plurality of teeth located on the circumferential surface; and
   moving the saw blade so that the saw blade cuts the sheet of copper alloy.

27. The method of claim 26, wherein the sheet of copper alloy has a thickness of less than 0.3 mm.

28. The method of claim 26, wherein the sheet of copper alloy has a thickness of about 0.2 mm.

29. The method of claim 26, wherein the thickness of the ring between the first side and the second side is less than 0.35 mm and wherein each of the teeth has a thickness of less than 0.35 mm.

30. The method of claim 26, wherein the thickness of the ring between the first side and the second side is approximately 80 um and wherein each of the teeth has a thickness of approximately 80 um.

31. The method of claim 26, wherein:
   setting a sheet of copper alloy on a chuck table includes providing a sheet of copper alloy with a dicing tape attached thereto;
   contacting the sheet of copper alloy with a saw blade includes contacting the sheet of copper alloy and the dicing tape with the saw blade; and
   moving the saw blade includes moving the saw blade so that the saw blade cuts the sheet of copper alloy and the dicing tape.

32. The method of claim 30, wherein providing a sheet of copper alloy with a dicing tape attached thereto includes providing a sheet of copper alloy with a dicing tape attached thereto wherein the dicing tape has a thickness of approximately 0.13 mm.

33. The method of claim 26, wherein the moving includes moving the saw blade so that the saw blade contacts the sheet in an upward direction relative to rotation of the saw blade.

34. The method of claim 26, wherein the saw blade is part of a singulating mechanism that singulates individual components from the sheet.

35. The method of claim 26, wherein a diameter of the circumferential surface is 7.4 cm or less.

36. The method of claim 26, wherein a diameter of the circumferential surface is between 4.9 cm and 7.4 cm.

37. The method of claim 26, wherein the thickness of the ring between the first side and the second side is between 0.08 mm and 0.3 mm.

38. The method of claim 26, wherein the teeth extend approximately 1.0 mm from the circumferential surface.

39. The method of claim 16, wherein the thickness of the ring between the first side and the second side is approximately 80 um and wherein each of the teeth has a thickness of approximately 80 um.

* * * * *